(12) United States Patent
Lubrano (10) Patent No.: US 9,336,067 B2
(45) Date of Patent: May 10, 2016

(54) METHOD AND SYSTEM TO RELEASE IMS RESOURCES USED BY IMS BATCH APPLICATION PROGRAMS

(71) Applicant: BMC Software, Inc., Houston, TX (US)

(72) Inventor: Anthony Louis Lubrano, Sugar Land, TX (US)

(73) Assignee: BMC Software, Inc., Houston, TX (US)

(*) Notice: Subject to any disclaimer, the term of this patent is extended or adjusted under 35 U.S.C. 154(b) by 253 days.

(21) Appl. No.: 13/930,453

(22) Filed: Jun. 28, 2013

(65) Prior Publication Data

US 2014/0280346 A1 Sep. 18, 2014

Related U.S. Application Data

(60) Provisional application No. 61/784,586, filed on Mar. 14, 2013.

(51) Int. Cl.
*G06F 9/54* (2006.01)
*G06F 17/30* (2006.01)

(52) U.S. Cl.
CPC ............ *G06F 9/541* (2013.01); *G06F 17/3064* (2013.01); *G06F 17/30557* (2013.01)

(58) Field of Classification Search
CPC .................... G06F 17/30864; G06F 17/30557; G06F 9/541
See application file for complete search history.

(56) References Cited

U.S. PATENT DOCUMENTS

| 7,685,122 | B1 | 3/2010 | Lubrano | |
|---|---|---|---|---|
| 2003/0110315 | A1* | 6/2003 | Upton | 709/328 |
| 2004/0054686 | A1* | 3/2004 | Hembry | 707/103 R |
| 2005/0198302 | A1* | 9/2005 | Ewanchuk et al. | 709/227 |
| 2008/0115136 | A1* | 5/2008 | Smith | G06F 11/1438 718/101 |
| 2008/0183879 | A1* | 7/2008 | Haller | G06F 17/30914 709/228 |
| 2008/0271049 | A1* | 10/2008 | Dinh et al. | 719/313 |
| 2012/0323947 | A1* | 12/2012 | Bice et al. | 707/760 |
| 2014/0258256 | A1* | 9/2014 | Dee | G06F 17/3056 707/705 |

* cited by examiner

*Primary Examiner* — Charles E Anya
(74) *Attorney, Agent, or Firm* — Brake Hughes Bellermann LLP (57) ABSTRACT

The embodiments provide a system for managing access to Information Management System (IMS) database resources. The system may include an initialization routine configured to generate a first task in response to an IMS batch job request to enable an application program access to IMS resources including attaching an IMS Coordinator Controller. The IMS Coordinator Controller may be configured to establish a database resource adaptor (DRA) connection to an IMS database control region. The initialization routine may be configured to generate a second task in response to the DRA connection being established including attaching an application program controller. The application program controller may be configured to transform a database access call from the application program to a DRA interface call to access the IMS resources via the DRA connection.

17 Claims, 5 Drawing Sheets

METHOD AND SYSTEM TO RELEASE IMS RESOURCES USED BY IMS BATCH APPLICATION PROGRAMS

TECHNICAL FIELD

This description relates to releasing IMS resources used by IMS batch application programs.

BACKGROUND

Current reorganization technologies require that Information Management System (IMS) Batch Message Processing (BMP), DLI (Data Language Interface) and DBB (IMS batch) jobs (all of which are heretofore referred to as IMS Batch jobs or IMS jobs) be temporarily stopped in order to reorganize databases that these jobs access. This may be a cumbersome process for customers as it requires that they coordinate production outages with the execution of their IMS database maintenance utilities. The risk of relying on manual intervention to properly stop and restart these IMS jobs is not feasible because a large IMS environment may contain dozens, even hundreds, of jobs to be stopped and restarted.

Also, current technologies that provide coordination between the IMS jobs accessing IMS databases and their maintenance utilities increase processing overhead for the IMS batch jobs as well as alter the execution dynamic of the IMS jobs by abending and restarting the IMS business application program. These shortcomings have been deemed tolerable due to the lack of automated or programmatic alternatives.

SUMMARY

The embodiments provide a system for managing access to Information Management System (IMS) database resources. The system may include at least one processor, and a non-transitory computer readable medium storing instructions, when executed by the at least one processor, are configured to implement one or more components for managing access to the IMS database resources including an initialization routine. The initialization routine may be configured to generate a first task in response to an IMS batch job request to enable an application program access to IMS resources including attaching an IMS Coordinator Controller. The IMS Coordinator Controller may be configured to establish a database resource adaptor (DRA) connection to an IMS database control region. The initialization routine may be configured to generate a second task in response to the DRA connection being established including attaching an application program controller. The application program controller may be configured to transform a database access call from the application program to a DRA interface call to access the IMS resources via the DRA connection.

The IMS Coordinator Controller configured to establish the DRA connection to the IMS database control region may include scheduling a program specification block (PSB) for execution. The scheduling the PSB for execution may include invoking, by the initialization routine, an IMS DRA interface routine.

The IMS Coordinator Controller configured to establish the DRA connection to the IMS database control region may include invoking a participant adapter parameter list (PAPL) builder configured to receive connection parameters from a product load library and generate a PAPL based on the connection parameters, and an IMS DRA interface routine configured to establish the DRA connection to the IMS database control region based on the PAPL.

The IMS Coordinator Controller may be configured to receive at least one return code from the IMS DRA interface routine, where the at least one return code may indicate whether the establishment of the DRA connection was successful.

The application program controller configured to transform the database access call to the DRA interface call may include a database program request handler configured to normalize a call parameters list related to the database access call, and a database language interface configured to generate at least one control block to use the DRA connection.

The initialization routine may be configured to receive a request to terminate the DRA connection when the application program is finished and configured to terminate the DRA connection in response to the request.

The initialization routine configured to terminate the DRA connection in response to the request may include invoking a participant adapter parameter list (PAPL) builder configured to generate a PAPL for terminating the DRA connection, and an IMS DRA interface routine configured to terminate the DRA connection to the IMS database control region based on the PAPL.

The embodiments may include a non-transitory computer-readable medium storing instructions that when executed cause at least one processor to manage access to Information Management System (IMS) database resources. The instructions may include instructions to generate a first task in response to an IMS batch job request to enable an application program access to IMS resources including attaching an IMS Coordinator Controller configured to establish a database resource adaptor (DRA) connection to an IMS database control region, and generate a second task in response to the DRA connection being established including attaching an application program controller configured to transform a database access call from the application program to a DRA interface call to access the IMS resources via the DRA connection.

The instructions to establish the DRA connection to the IMS database control region may include instructions to schedule a program specification block (PSB) for execution. The instructions to schedule the PSB for execution may include instructions to invoke an IMS DRA interface routine.

The instructions to establish the DRA connection to the IMS database control region may include instructions to receive connection parameters from a product load library, generate a PAPL based on the connection parameters, and establish the DRA connection to the IMS database control region based on the PAPL.

The instructions may include instructions to receive at least one return code from the IMS DRA interface routine, where the at least one return code may indicate whether the establishment of the DRA connection was successful.

The instructions to transform the database access call to the DRA interface call may include instructions to normalize a call parameters list related to the database access call, and generate at least one control block to use the DRA connection.

The instructions may include instructions to receive a request to terminate the DRA connection when the application program is finished and terminate the DRA connection in response to the request.

The instructions to terminate the DRA connection in response to the request may include instructions to generate a PAPL for terminating the DRA connection, and terminate the DRA connection to the IMS database control region based on the PAPL.

A computer-implemented method for managing access to Information Management System (IMS) database resources may include generating, by an initialization routine, a first task in response to an IMS batch job request to enable an application program access to IMS resources including attaching an IMS Coordinator Controller configured to establish a database resource adaptor (DRA) connection to an IMS database control region, and generating, by the initialization routine, a second task in response to the DRA connection being established including attaching an application program controller configured to transform a database access call from the application program to a DRA interface call to access the IMS resources via the DRA connection.

The IMS Coordinator Controller configured to establish the DRA connection to the IMS database control region may include invoking a participant adapter parameter list (PAPL) builder configured to receive connection parameters from a product load library and generate a PAPL based on the connection parameters, and invoking an IMS DRA interface routine configured to establish the DRA connection to the IMS database control region based on the PAPL.

The application program controller configured to transform the database access call to the DRA interface call may include invoking a database program request handler configured to normalize a call parameters list related to the database access call, and invoking a database language interface configured to generate at least one control block to use the DRA connection.

The method may include terminating, by the initialization routine, the DRA connection including invoking a participant adapter parameter list (PAPL) builder configured to generate a PAPL for terminating the DRA connection and invoking an IMS DRA interface routine configured to terminate the DRA connection to the IMS database control region based on the PAPL.

The details of one or more implementations are set forth in the accompanying drawings and the description below. Other features will be apparent from the description and drawings, and from the claims.

DETAILED DESCRIPTION

The present description relates to providing high-performance IMS database access that can be programmatically interrupted without altering the execution dynamics of the IMS batch jobs. The system may include any mainframe product that provides batch IMS business application programs access to IMS database resources through a database resource adaptor (DRA) interface/connection. Further, the system may avoid task-switching between task control blocks (TCBs). For example, some conventional approaches may use components for using one of the TCBs for connecting to the IMS database, and then task switching the database calls between the TCBs. However, the system discussed below may avoid such task-switching operations, thereby improving performance and reducing overhead.

According to the embodiments, when an IMS batch job is started, the system may perform an initialization process to obtain access to various IMS resources. In one embodiment, the system may establish a cross-memory environment between the IMS database system and the IMS business application program. By replacing a portion of a standard initialization process with the designed system in this disclosure, an IMS database resource adapter (DRA) interface/connection is utilized, thereby allowing IMS database access through the IMS control region without any changes to the business application programs. IMS database access may be wholly transparent to the IMS business application program. As further described below, database access calls by the application program may be transformed to DRA interface calls.

Figure 1:
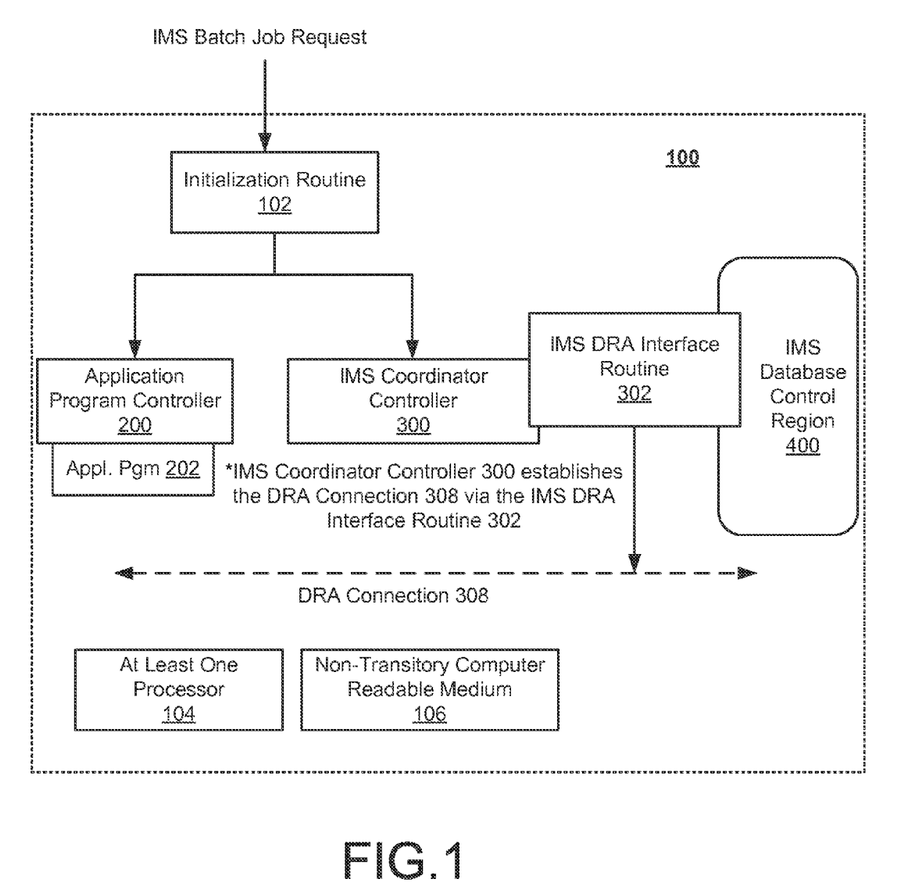
FIG. 1 illustrates a system for managing access to Information Management System (IMS) database resources.

FIG. 1 illustrates a system 100 for managing access to Information Management System (IMS) database resources. In one embodiment, as shown in FIG. 1, the system 100 may include an initialization routine 102 (e.g., BRDRRC00), an application program controller 200 (e.g., BRDPCC20), an application program 202, an IMS Coordinator Controller 300 (e.g., BRDIMSCN), an IMS database resource adaptor (DRA) interface routine 302 (e.g., DFSPRRC0), an IMS database control region 400 (e.g., IMS DBCTL), at least one processor 104, and a non-transitory computer readable medium 106. The system 100 may include other components that are well known to one of ordinary skill in the art for implementing an IMS database system.

The non-transitory computer readable medium 106 may include instructions, that when executed by the at least one processor 104, are configured to implement the components and/or functionalities of the system 100, as further described below. The non-transitory computer readable medium 106 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Besides storing executable instructions, the non-transitory computer-readable medium 106 may also store any type of database structure discussed herein. The at least one processor 104 may include one or more processors that carries out the functionalities provided by the components of the system. In one example, the at least one processor 104 may be any type of special purpose logic circuitry, e.g., an FPGA (field programmable gate array) or an ASIC (application-specific integrated circuit).

Generally, the initialization routine 102 may construct a pseudo-IMS environment that includes control blocks such as System Contents Directory (SCD), Partition Specification Table (PST), Dependent Region Interregion Communication Area (DIRCA), Environment Control Parameters (DFSECP), Parameter Anchor Block (PARMBLK), Resource Routing Table (RRT), and Database Program Communication Block (DBPCB) control blocks, for example. The initialization routine 102 may initialize, anchor, and chain the control blocks in a manner to be consistent with a true IMS environment. This allows the application program 202 that utilize the various control blocks to locate the target IMS resources and execute its functions within the boundaries of the established pseudo-IMS environment. Also, the pseudo-IMS environment may allow IMS application programming interfaces to operate without altering the business application program 202. For instance, the system 100 may replace the IMS region controller program (e.g., DFSRRC00) with the initialization routine 102. As a result, the pseudo-IMS environment may be constructed to include the above-described control blocks, which are further explained below.

In particular, the initialization routine 102 may be configured to generate a first task (e.g., the IMS Coordinator Controller 300) in response to an IMS batch job request to enable an application program 202 access to IMS resources (e.g., IMS database control region 400). For example, upon receiving the IMS batch job request, the initialization routine 102 may be configured to attach the IMS Coordinator Controller 300. The IMS Coordinator Controller 300 may be configured to establish the DRA connection 308 to the IMS database control region 400.

In more detail, the IMS Coordinator Controller 300 configured to establish the DRA connection 308 to the IMS database control region 400 may include scheduling a program specification block (PSB) for execution. Also, the scheduling of the PSB for execution may include invoking, by the initialization routine 102, the IMS DRA interface routine 302. For example, the initialization routine 102 may parse an IMS execution parameter string (included in the IMS batch job request) in order to establish the DRA connection 308 to the IMS database control region 400 and then schedule the requisite PSB (e.g., found in the execution parameter) for execution within the IMS database control region 400. To accomplish this, the initialization routine 102 may attach the IMS Coordinator Controller 300. The IMS Coordinator Controller 300 may then invoke the IMS DRA interface routine 302 which will establish the DRA connection 308 and schedule the PSB for execution. The establishment of the DRA connection 308 is further explained with reference to FIG. 3.

Also, the initialization routine 102 may be configured to generate a second task (e.g., the application program controller 200) in response to the DRA connection 308 being established. For example, the initialization routine 102 may be configured to attach the application program controller 200. The application program controller 200 may be configured to transform a database access call from the application program 202 to a DRA interface call to access the IMS resources via the DRA connection 308. Attaching the application program controller 200 may provide an isolated execution environment for the business application program 202. For example, database access calls may be transformed into DRA interface access calls, and any information may be transmitted from/to the application program 202 via the DRA connection 308.

As shown in FIG. 1, the business application program 202 and the DRA connection 308 execute under different task control blocks. For example, the business application program 202 executes under the application program controller 200, and the establishment/termination of the DRA connection 308 executes under the IMS Coordinator Controller 300 via the IMS DRA interface routine 302. Utilizing multiple task control blocks in this manner may allow the system 100 to terminate and restart the DRA connection 208 without terminating the application program 202. Then, using Open Thread Task technology implemented into IMS v12, IMS database calls can be issued directly from the application program controller 200 thereby avoiding any task switching overhead.

Figure 2:
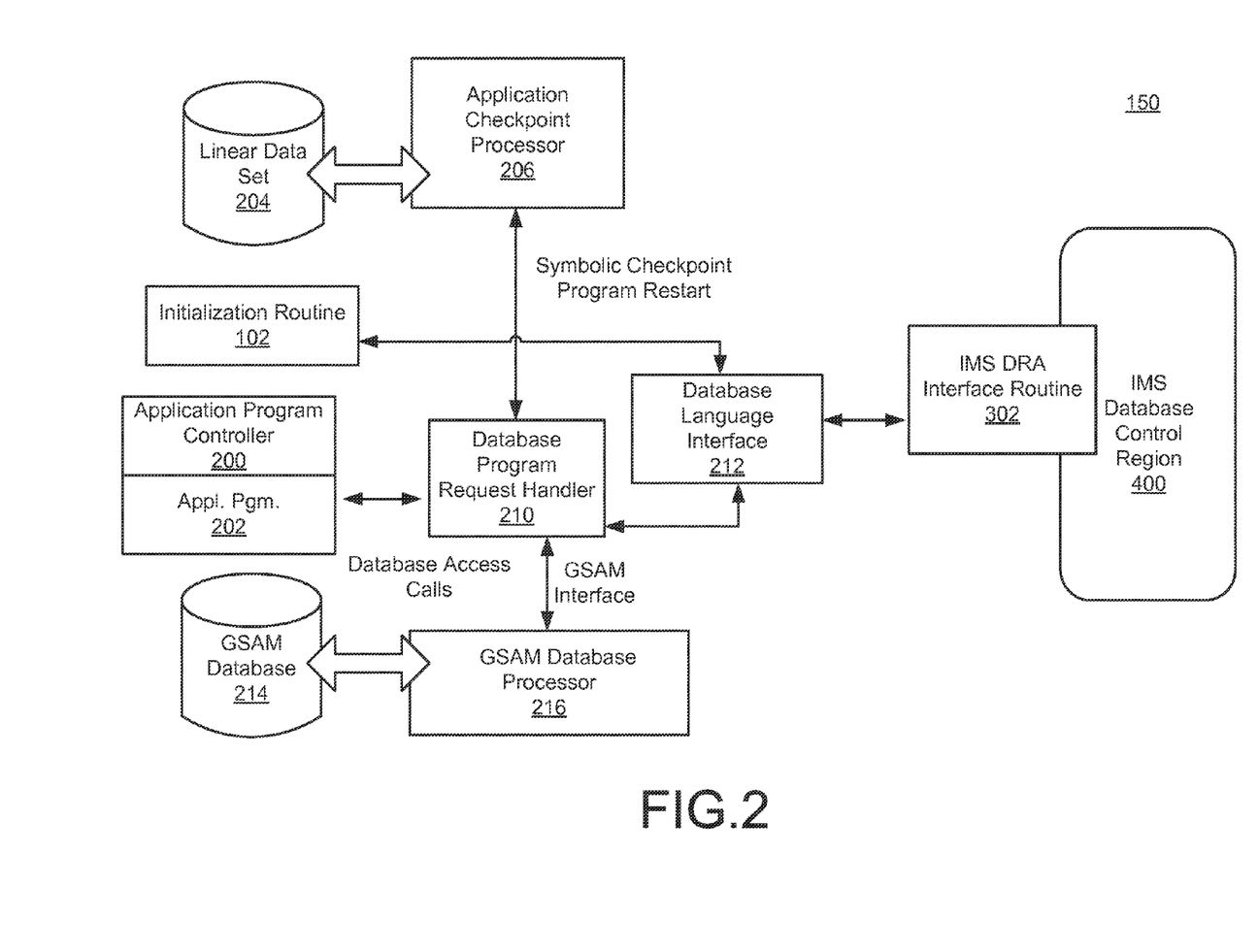
FIG. 2 illustrates a more detailed implementation of an application program controller according to an embodiment.

FIG. 2 illustrates a system 150 that provides a more detailed implementation of the application program controller 200 (e.g., BRDPCC20). For example, the system 150 may include a linear dataset database 204 (e.g., VSAM LDS), an application checkpoint processor 206 (e.g., BRDCPDLI), the initialization routine 102, the application program controller 200, the application program 202, a database program request handler 210 (e.g., BRDPRH00), a database language interface 212 (e.g., BRDLI000), a GSAM database 214, a GSAM database processor 216 (e.g., BRDGSDLI), the IMS DRA interface routine 302, and the IMS database control region 400. The system 150 may include other components that are well known to one of ordinary skill in the art for implementing an IMS system.

As described with reference to FIG. 1, referring to FIG. 2, the initialization routine 102 may establish the DRA connection 308 (via the IMS Coordinator Controller 300) by invoking the IMS DRA interface routine 302. In this example, initialization routine 102 may invoke the database language interface 212 (which creates the necessary control blocks) and the IMS DRA interface routine 302 which establishes the DRA connection 308, as further explained with reference to FIG. 3.

The application program controller 200 configured to transform the database access call to the DRA interface call may include the database program request handler 210 configured to normalize a call parameters list related to the database access call, and the database language interface 212 configured to generate at least one control block to use the DRA connection 308. For example, as IMS database access calls are made by the business application program 202, the database access calls may be provided to the database program request handler 210. The database program request handler 210 may normalize the call parameter list, and then provide the normalized call parameter list to the database language interface 212. The database language interface 212 may create the control blocks necessary to facilitate use of the DRA connection 308.

Due to the Open Thread Task interface available only through the IMS DRA interface, the IMS database calls may be executed from TCBs that are not directly connected to the IMS database control region 400. This may avoid task switching between TCBs. If any IMS resources need to be released for online reorganization purposes, the system 100/150 can terminate and restart the TCB connected to the IMS database control region 400 as needed without impacting the business application program 202, as further explained with reference to FIGS. 3 and 4.

The application checkpoint processor 206 may access the linear dataset 204, and copy application data areas as provided by the application program 202 via standard IMS checkpoint and/or program restart calls to the database program request handler 210. In one example, the IMS DRA interface routine 302 may not support IMS application checkpoint and/or restart calls thereby making IMS extended restart functionality the responsibility of the overall product. Saving data provided by the application program 202 in the linear dataset 204 will allow the IMS extended restart functionality implemented by the application program 202 to be processed by the product. However, the embodiments may encompass IMS DRA interfaces that provide such symbolic check pointing support.

Also, because the IMS DRA interface routine 302 may not support access to the GSAM database 214, the system 150 may include the GSAM database processor 216 that is configured to handle calls from/to the application program 202 to access/provide information from the GSAM database 214. The IMS DRA interface routine 302 may not support GSAM database access and must therefore be the responsibility of the overall product. In one example, the GSAM database 214 may use BSAM or VSAM data sets to store processing parameters or output reports through IMS services.

Figure 3:
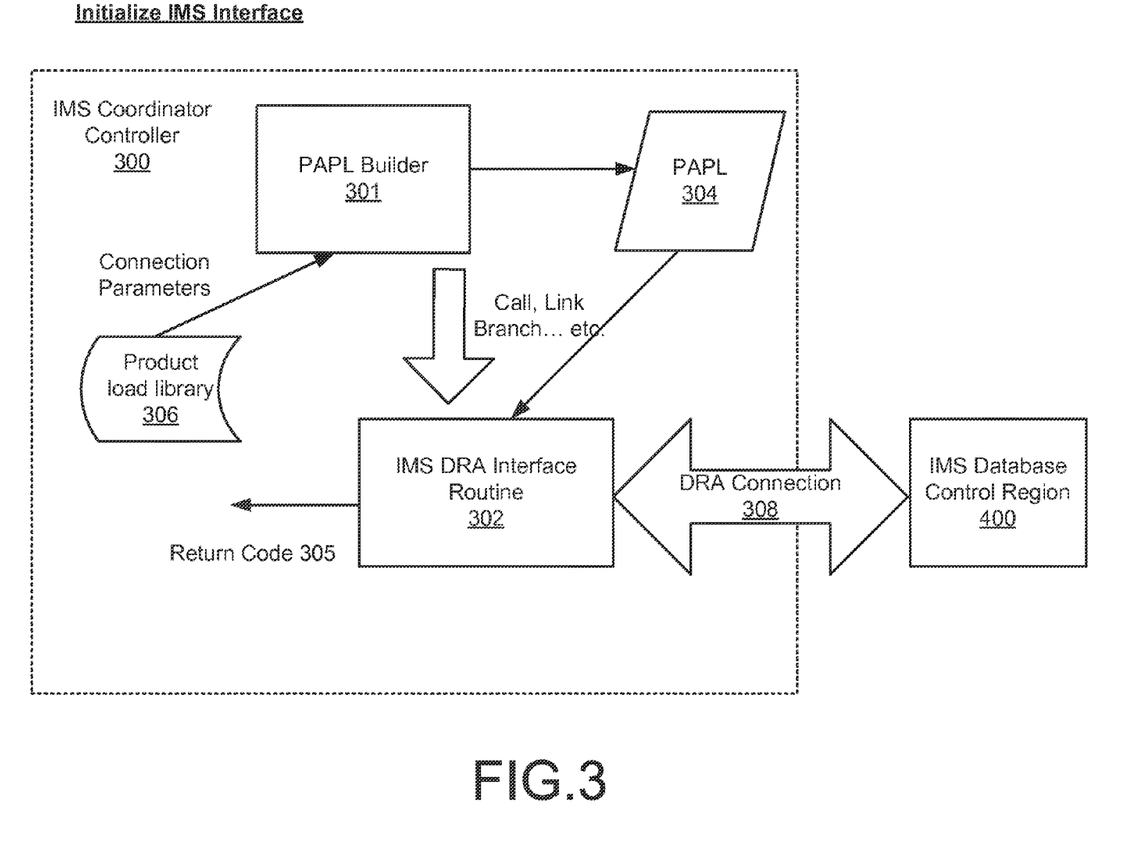
FIG. 3 illustrates a more detailed implementation of an IMS Coordinator Controller related to initializing the DRA connection according to an embodiment.

FIG. 3 illustrates a more detailed version of the functionalities of the IMS Coordinator Controller 300 related to initializing the DRA connection 308 according to an embodiment. For example, the IMS Coordinator Controller 300 may include/interface with a product load library 306 configured to provide connection parameters (e.g., DFSPZPFF), a participant adaptor parameter list (PAPL) builder 301 configured to generate a PAPL 304 based on the connection parameters, the IMS DRA interface routine 302 that is invoked by the IMS Coordinator Controller 300 and configured to initialize the DRA connection 308 to the IMS database control region 400.

For example, the PAPL builder 301 may be configured to receive connection parameters from the product load library 306 and generate the PAPL 304 based on the connection parameters. The IMS DRA interface routine 302 may be configured to establish the DRA connection 308 to the IMS database control region 400 based on the PAPL 304. Further, the IMS Coordinator Controller 300 may receive at least one return code 305 from the IMS DRA interface routine 302, where the at least one return code 305 indicates whether the establishment of the DRA connection was successful.

Figure 4:
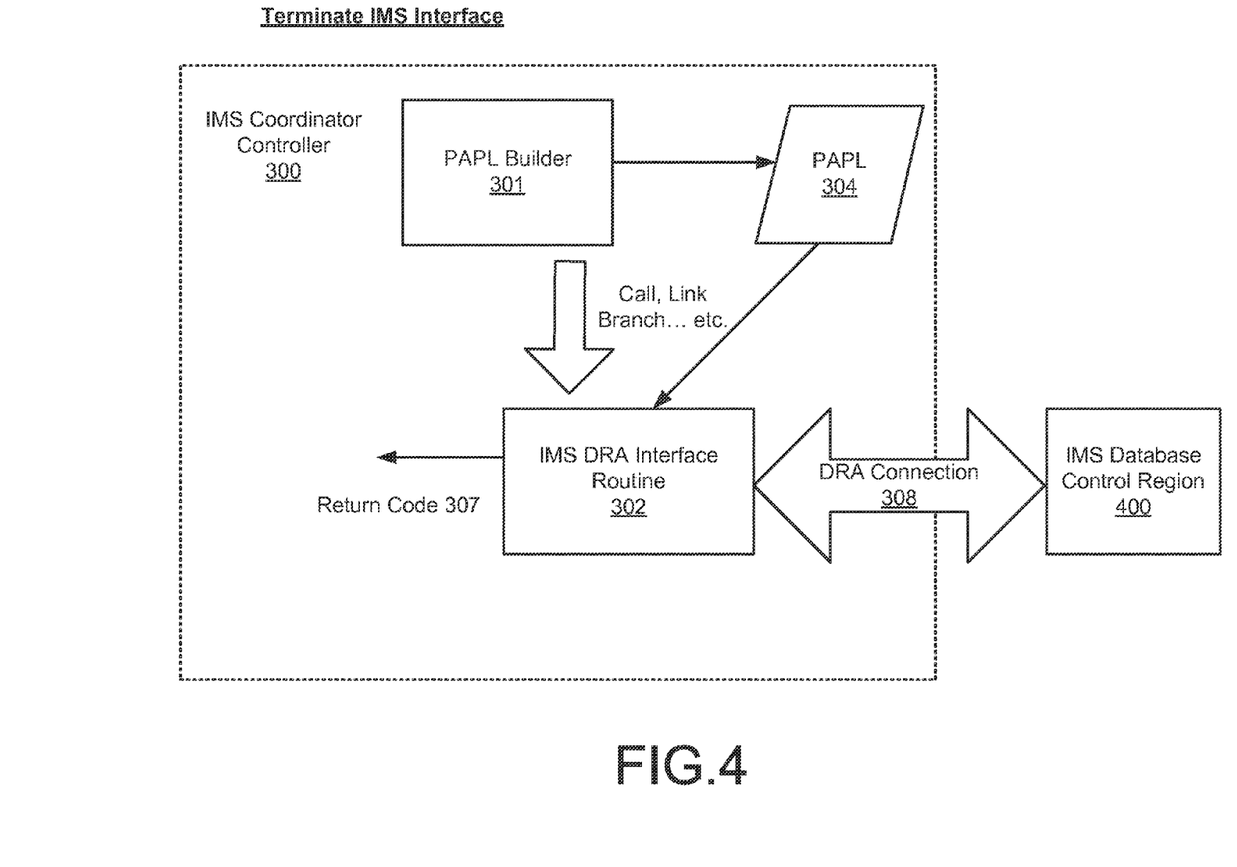
FIG. 4 illustrates a more detailed implementation of the IMS Coordinator Controller related to terminating the DRA connection according to an embodiment.

FIG. 4 illustrates a more detailed version of the functionalities of the IMS Coordinator Controller 300 related to terminating the DRA connection 308 according to an embodiment. For example, the IMS Coordinator Controller 300 may include the PAPL builder 301 configured to generate a PAPL 304 that includes parameters for terminating the DRA connection 308, and the IMS DRA interface routine 302 that is invoked by the IMS Coordinator Controller 300 and configured to terminate the DRA connection 308 to the IMS database control region 400 based on the PAPL 304.

For example, the PAPL builder 301 may be configured to generate the termination parameters (e.g., the PAPL 304). The IMS DRA interface routine 302 may be configured to terminate the DRA connection 308 to the IMS database control region 400 based on the PAPL 304. Further, the IMS Coordinator Controller 300 may receive at least one return code 307 from the IMS DRA interface routine 302, where the at least one return code 307 indicates whether the termination of the DRA connection was successful.

Figure 5:
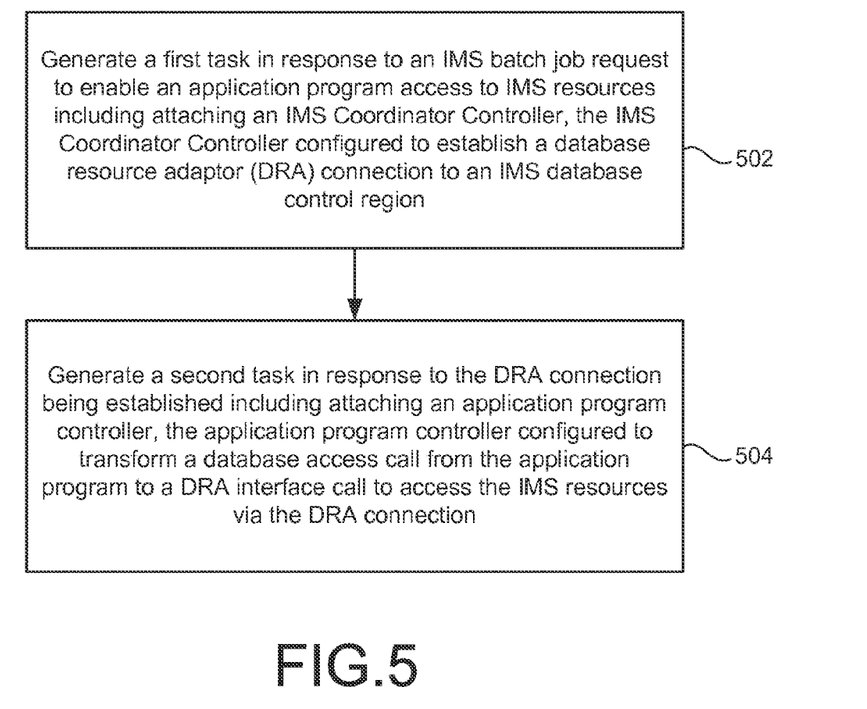
FIG. 5 illustrates example operations of the system of FIG. 1 according to an embodiment.

FIG. 5 a flowchart illustrating example operations of the system 100 of FIG. 1 according to an embodiment. Although FIG. 5 is illustrated as a sequential, ordered listing of operations, it will be appreciated that some or all of the operations may occur in a different order, or in parallel, or iteratively, or may overlap in time.

A first task may be generated in response to an IMS batch job request to enable an application program access to IMS resources including attaching an IMS Coordinator Controller, where the IMS Coordinator Controller is configured to establish a database resource adaptor (DRA) connection to an IMS database control region (502).

For example, referring to FIG. 1, the initialization routine 102 may be configured to generate a first task (e.g., the IMS Coordinator Controller 300) in response to an IMS batch job request to enable an application program 202 access to IMS resources (e.g., IMS database control region 400). For example, upon receiving the IMS batch job request, the initialization routine 102 may be configured to attach the IMS Coordinator Controller 300. The IMS Coordinator Controller 300 may be configured to establish the DRA connection 308 to the IMS database control region 400.

In more detail, the IMS Coordinator Controller 300 configured to establish the DRA connection 308 to the IMS database control region 400 may include scheduling a program specification block (PSB) for execution. Also, the scheduling of the PSB for execution may include invoking, by the initialization routine 102, the IMS DRA interface routine 302. For example, the initialization routine 102 may parse an IMS execution parameter string (included in the IMS batch job request) in order to establish the DRA connection 308 to the IMS database control region 400 and then schedule the requisite PSB (e.g., found in the execution parameter) for execution within the IMS database control region 400. To accomplish this, the initialization routine 102 may attach the IMS Coordinator Controller 300. The IMS Coordinator Controller 300 may then invoke the IMS DRA interface routine 302 which will establish the DRA connection 308 and schedule the PSB for execution.

In further detail, referring to FIG. 3, the PAPL builder 301 may be configured to receive connection parameters from the product load library 306 and generate the PAPL 304 based on the connection parameters. The IMS DRA interface routine 302 may be configured to establish the DRA connection 308 to the IMS database control region 400 based on the PAPL 304. Further, the IMS Coordinator Controller 300 may receive at least one return code 305 from the IMS DRA interface routine 302, where the at least one return code 305 indicates whether the establishment of the DRA connection was successful.

Referring back to FIG. 5, a second task may be generated in response to the DRA connection being established including attaching an application program controller, where the application program controller is configured to transform a database access call from the application program to a DRA interface call to access the IMS resources via the DRA connection (504).

For example, referring to FIG. 1, the initialization routine 102 may be configured to generate a second task (e.g., the application program controller 200) in response to the DRA connection 308 being established. For example, the initialization routine 102 may be configured to attach the application program controller 200. The application program controller 200 may be configured to transform a database access call from the application program 202 to a DRA interface call to access the IMS resources via the DRA connection 308. Attaching the application program controller 200 may provide an isolated execution environment for the business application program 202. For example, database access calls may be transformed into DRA interface access calls, and any information may be transmitted from/to the application program 202 via the DRA connection 308.

As shown in FIG. 1, the business application program 202 and the DRA connection 308 execute under different task control blocks. For example, the business application program 202 executes under the application program controller 200, and the establishment/termination of the DRA connection 308 executes under the IMS Coordinator Controller 300 via the IMS DRA interface routine 302.

In further detail, referring to FIG. 2, the application program controller 200 configured to transform the database access call to the DRA interface call may include the database program request handler 210 configured to normalize a call parameters list related to the database access call, and the database language interface 212 configured to generate at least one control block to use the DRA connection 308. For example, as IMS database access calls are made by the business application program 202, the database access calls may be provided to the database program request handler 210. The database program request handler 210 may normalize the call parameter list, and then provide the normalized call parameter list to the database language interface 212. The database language interface 212 may create the control blocks necessary to facilitate use of the DRA connection 308.

Due to the Open Thread Task interface available only through the IMS DRA interface, the IMS database calls may be executed from TCBs that are not directly connected to the IMS database control region 400. This may avoid task switching between TCBs. If any IMS resources need to be released for online reorganization purposes, the system 100/150 can terminate and restart the TCB connected to the IMS database control region 400 as needed without impacting the business application program 202.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

The invention claimed is:

1. A system for managing access by an Information Management System (IMS) database batch job application program to IMS resources that are available in an IMS database control region normally under supervision of an IMS region controller program, the system comprising:
   at least one processor; and
   a non-transitory computer-readable medium storing instructions, which when executed by the at least one processor, implement:
      an application program controller;
      an IMS Coordinator Controller;
      an IMS database resource adaptor (DRA); and
      an initialization routine to generate a pseudo-IMS environment in response to an IMS batch job request,
   wherein the pseudo-IMS environment includes one or more control blocks that are utilized by the application program to locate IMS database resources needed for executing application program functions within the boundaries of the pseudo-IMS environment,
   wherein the initialization routine attaches the IMS Coordinator Controller,
   wherein the IMS Coordinator Controller utilizes the DRA to establish a DRA connection to the IMS database control region,
   wherein the initialization routine, in response to the DRA connection being established, further attaches the application program controller, wherein the application program controller provides an application program execution environment that is isolated from the DRA connection, and transforms a database access call from the application program to a DRA interface call to access the needed IMS resources via the DRA connection, wherein using the IMS Coordinator Controller and the application program controller allows termination and restart of the DRA connection without terminating the application program, and wherein transforming the database access call includes normalizing a call parameter list by a program request handler and providing the normalized call parameter list to a database language interface.

2. The system of claim 1, wherein the IMS Coordinator Controller establishes the DRA connection to the IMS database control region by scheduling a program specification block (PSB) for execution.

3. The system of claim 2, wherein the scheduling the PSB for execution includes invoking, by the initialization routine, an IMS DRA interface routine.

4. The system of claim 1, wherein the IMS Coordinator Controller establishes the DRA connection to the IMS database control region by invoking:
   a participant adapter parameter list (PAPL) builder that receives connection parameters from a product load library and generates a PAPL based on the connection parameters; and
   an IMS DRA interface routine that establishes the DRA connection to the IMS database control region based on the PAPL.

5. The system of claim 4, wherein the IMS Coordinator Controller receives at least one return code from the IMS DRA interface routine, the at least one return code indicating whether the establishment of the DRA connection was successful.

6. The system of claim 1, wherein the initialization routine receives a request to terminate the DRA connection when the application program is finished and terminates the DRA connection in response to the request.

7. The system of claim 6, wherein the initialization routine terminates the DRA connection in response to the request by invoking:
   a participant adapter parameter list (PAPL) builder to generate a PAPL for terminating the DRA connection; and
   an IMS DRA interface routine to terminate the DRA connection to the IMS database control region based on the PAPL.

8. A non-transitory computer-readable medium storing instructions that when executed cause at least one processor to manage access by an Information Management System (IMS) database batch job application program to IMS resources that are available in an IMS database control region normally under supervision of an IMS region controller program, the instructions comprising instructions to:
   execute an initialization routine to generate a pseudo-IMS environment in response to an IMS batch job request, the pseudo-IMS environment includes one or more control blocks that are utilized by the application program to locate IMS database resources needed for executing application program functions within the boundaries of the pseudo-IMS environment,
   wherein the initialization routine attaches an IMS Coordinator Controller,
   wherein the IMS Coordinator Controller utilizes a database resource adaptor (DRA) to establish a DRA connection to the IMS database control region,
   wherein the initialization routine, in response to the DRA connection being established, further attaches an application program controller, wherein the application program controller provides an application program execution environment that is isolated from the DRA connection and transforms a database access call from the application program to a DRA interface call to access the needed IMS resources via the DRA connection, wherein using the IMS Coordinator Controller and the application program controller allows termination and restart of the DRA connection without terminating the application program and wherein transforming the database access call includes normalizing a call parameter list by a program request handler and providing the normalized call parameter list to a database language interface.

9. The non-transitory computer-readable medium of claim 8, wherein the instructions to establish the DRA connection to the IMS database control region include instructions to schedule a program specification block (PSB) for execution.

10. The non-transitory computer-readable medium of claim 9, wherein the instructions to schedule the PSB for execution include instructions to invoke an IMS DRA interface routine.

11. The non-transitory computer-readable medium of claim 10, further comprising instructions to:
   receive at least one return code from the IMS DRA interface routine, the at least one return code indicating whether the establishment of the DRA connection was successful.

12. The non-transitory computer-readable medium of claim 9, wherein the instructions to establish the DRA connection to the IMS database control region include instructions to:
   receive connection parameters from a product load library;
   generate a PAPL based on the connection parameters; and
   establish the DRA connection to the IMS database control region based on the PAPL.

13. The non-transitory computer-readable medium of claim 8, further comprising instructions to:
   receive a request to terminate the DRA connection when the application program is finished and terminate the DRA connection in response to the request.

14. The non-transitory computer-readable medium of claim 13, wherein the instructions to terminate the DRA connection in response to the request include instructions to:
   generate a PAPL for terminating the DRA connection; and
   terminate the DRA connection to the IMS database control region based on the PAPL.

15. A computer-implemented method for managing access by an Information Management System (IMS) database batch job application program to IMS resources that are available in an IMS database control region normally under supervision of an IMS region controller program, the method comprising:
   generating, by an initialization routine, a pseudo-IMS environment in response to an IMS batch job request, wherein the pseudo-IMS environment includes one or more control blocks that are utilized by the application program to locate IMS database resources needed for executing application program functions within the boundaries of the pseudo-IMS environment,
   attaching, by the initialization routine, an IMS Coordinator Controller, wherein the IMS Coordinator Controller utilizes a database resource adaptor (DRA) to establish a DRA connection to the IMS database control region, and
   further, in response to the DRA connection being established, attaching, by the initialization routine, an application program controller, wherein the application program controller provides an application program execution environment that is isolated from the DRA connection and transforms a database access call from the application program to a DRA interface call to access the needed IMS resources via the DRA connection, wherein using the IMS Coordinator Controller and the application program controller allows termination and restart of the DRA connection without terminating the application program and wherein transforming the database access call includes normalizing a call parameter list by a program request handler and providing the normalized call parameter list to a database language interface.

16. The computer-implemented method of claim 15, wherein attaching the IMS Coordinator Controller to establish the DRA connection to the IMS database control region includes:
   invoking a participant adapter parameter list (PAPL) builder to receive connection parameters from a product load library and generate a PAPL based on the connection parameters; and
   invoking an IMS DRA interface routine to establish the DRA connection to the IMS database control region based on the PAPL.

17. The computer-implemented method of claim 15, further comprising:
   terminating, by the initialization routine, the DRA connection by invoking a participant adapter parameter list (PAPL) builder to generate a PAPL for terminating the DRA connection and invoking an IMS DRA interface routine to terminate the DRA connection to the IMS database control region based on the PAPL.

\* \* \* \* \*